(12) United States Patent
Kim et al.

(10) Patent No.: US 7,277,149 B2
(45) Date of Patent: Oct. 2, 2007

(54) ARRAY SUBSTRATE FOR IN PLANE SWITCHING MODE LIQUID CRYSTAL DISPLAY DEVICE AND METHOD FOR MANUFACTURING THE SAME

(75) Inventors: Woo Hyun Kim, Seoul (KR); Myoung Kee Baek, Suwon-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 187 days.

(21) Appl. No.: 10/934,360

(22) Filed: Sep. 7, 2004

(65) Prior Publication Data
US 2005/0052604 A1    Mar. 10, 2005

(30) Foreign Application Priority Data
Sep. 8, 2003    (KR) ................. 10-2003-0062765

(51) Int. Cl.
*G02F 1/1343*    (2006.01)
(52) U.S. Cl. ........................... 349/141; 349/43
(58) Field of Classification Search ............... 349/141, 349/43; 438/30
See application file for complete search history.

(56) References Cited

U.S. PATENT DOCUMENTS

| | | | |
|---|---|---|---|
| 6,177,970 B1 * | 1/2001 | Kim ........................... | 349/43 |
| 6,819,309 B1 * | 11/2004 | Kishi ........................... | 345/87 |
| 6,839,114 B2 * | 1/2005 | Moon et al. ................... | 349/141 |
| 2002/0057411 A1 * | 5/2002 | Kim et al. ................... | 349/141 |
| 2002/0093614 A1 | 7/2002 | Moon et al. | |
| 2003/0124865 A1 * | 7/2003 | Baek et al. ................... | 438/694 |

OTHER PUBLICATIONS

Communication from Chinese Patent Office dated Aug. 11, 2006.

* cited by examiner

*Primary Examiner*—David Nelms
*Assistant Examiner*—David Y. Chung
(74) *Attorney, Agent, or Firm*—McKenna Long & Aldridge LLP (57) ABSTRACT

A method of manufacturing an array substrate for an IPS mode LCD device includes: forming a gate electrode, a gate line, a data line and a common line using a printing process; forming an active layer on the substrate including the gate electrode using a printing process; forming a source electrode, a drain electrode, a pixel electrode including a plurality of zigzag-shaped pixel electrode bars, and a common electrode including a plurality common electrode bars arranged in an alternating pattern with the pixel electrode bars using a photo process; forming at least one contact hole on the substrate including the thin film transistor using a printing process to expose a portion of the common electrode line and a portion of the common electrode; and forming a connecting metal using a printing process to electrically connect the common electrode line and the common electrode through the at least one contact hole. Accordingly, it is possible to reduce a cost and simplify manufacturing procedures using one photo process and four printing processes.

10 Claims, 8 Drawing Sheets

ARRAY SUBSTRATE FOR IN PLANE SWITCHING MODE LIQUID CRYSTAL DISPLAY DEVICE AND METHOD FOR MANUFACTURING THE SAME

This application claims the benefit of Korean Patent Application No. 2003-62765, filed on Sep. 8, 2003, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to an array substrate for an IPS mode LCD device and a method for manufacturing the same which are capable of simplifying a manufacturing process.

2. Description of the Related Art

Liquid crystal display (LCD) devices have advantageous features such as low voltage operation, low power consumption, lightweight and slim profile, and full color realization. Because of these advantages, LCD devices are widely used as displays for watches and calculators, as a monitor of a computer, a monitor having television-receiving functions, television sets, and hand-held terminals.

The LCD devices make use of optical anisotropy and polarization properties of liquid crystal because the liquid crystals have a thin and long structure and a directionality to arrange liquid crystal molecules. Therefore, the arrangement direction of the liquid crystal molecules can be controlled by applying an electric field to the liquid crystals. If the arrangement direction of the liquid crystal molecules is arbitrarily adjusted, a polarized light may be arbitrarily modulated based upon the optical anisotropy. In this manner, predetermined images may be displayed on the LCD device.

The TN (Twisted Nematic) mode LCD device is widely used, but has a problem in that the viewing angle is narrow. The technologies for widening such a viewing angle are being studied and include an In Plane Switching (IPS) mode LCD device and a Vertical Alignment (VA) mode LCD device.

Figure 1:
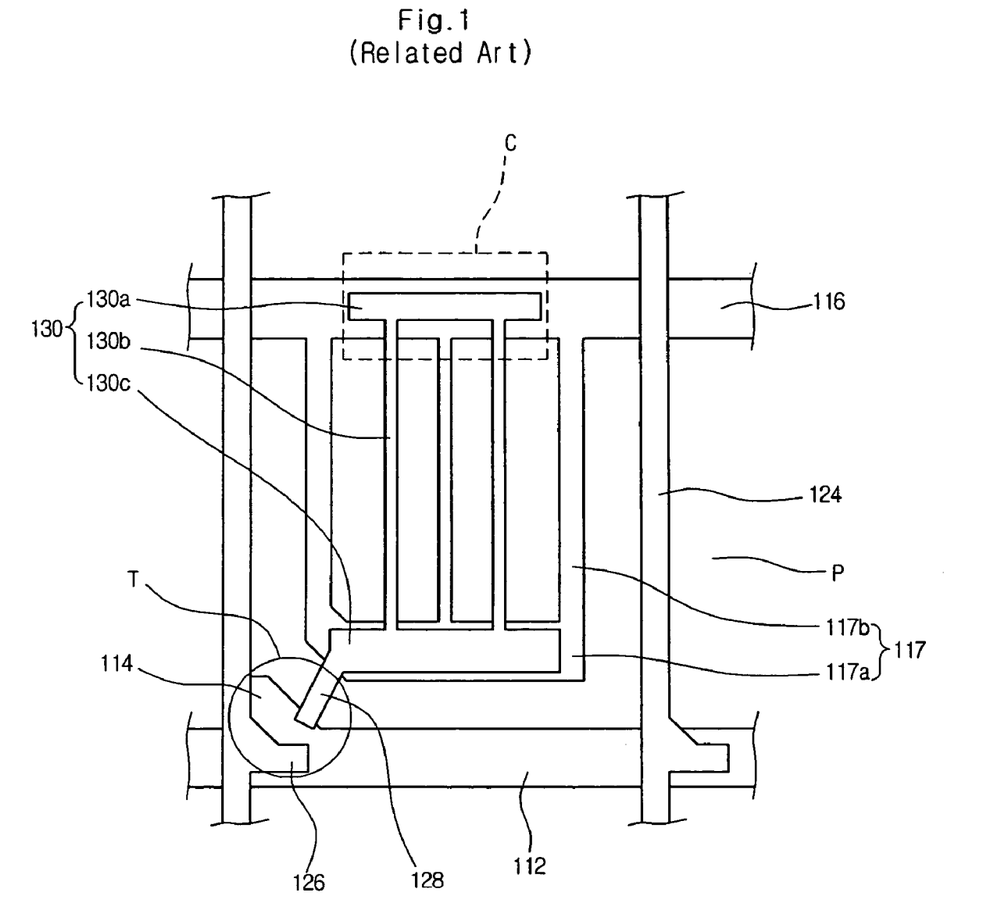
FIG. 1 is a plan view of an array substrate for a related art IPS mode LCD device.

FIG. 1 is a schematic plan view showing a portion of a related art IPS mode LCD device. The LCD device includes an array substrate, an opposite substrate arranged opposite the array substrate, and a liquid crystal layer interposed between the array substrate and the opposite substrate.

In FIG. 1, the related art IPS mode LCD device includes a plurality of gate lines 112 spaced apart from each other by a predetermined distance and arranged substantially parallel to a first direction, a plurality of common lines 116 formed in the same direction as the gate lines 112, and a plurality of data lines 124 arranged in a second direction that are substantially perpendicular to the gate lines 112 and the common lines 116. A pixel region P is defined by the gate line 112 and the data line 124.

A thin film transistor T is formed at a crossing point of the gate line 112 and the data line 124. The thin film transistor T includes a gate electrode 114, an active layer (not shown), a source electrode 126 and a drain electrode 128. The source electrode 126 is connected to the data line 124, and the gate electrode 114 is connected to the gate line 112. Also, the drain electrode 128 is connected to the pixel electrode 130.

The pixel electrode 130 includes a plurality of vertical pixel electrode bars 130b and horizontal pixel electrode bars 130a and 130c. The vertical pixel electrode bars 130b are arranged substantially parallel to the data line 124 and spaced apart from one another by a predetermined distance. The horizontal pixel electrode bars 130a and 130c are connected to both ends of the vertical pixel electrode bars 130b and arranged substantially perpendicular to the data line 124. The horizontal pixel electrode bar 130c is connected to the drain electrode 128.

The common electrode 117 is connected to the common line 116. The common electrode 117 includes a plurality of vertical common electrode bars 117b and a horizontal common electrode bar 117a. The vertical common electrode bars 117b are arranged substantially parallel to the data line 124 and spaced apart from the vertical pixel electrode bar 130b by a predetermined distance. The horizontal common electrode bars 117a are connected to the vertical common electrode bars 117b and arranged substantially perpendicular to the data line 124. Each of the vertical common electrode bars 117b has one terminal connected to the common line 116 and the other terminal connected to the horizontal common electrode bar 117a. The horizontal pixel electrode bar 130a is arranged on a portion of the common line 116, with the gate insulating layer (not shown) interposed therebetween. Thus, a storage capacitor C is formed between the common line 116 and the horizontal pixel electrode bar 130a.

Accordingly, the plurality of vertical pixel electrode bars 130b and the plurality of vertical common electrode 117b are arranged in an alternating pattern and cross each other.

The array substrate for the related art IPS LCD device is generally manufactured using a five-mask process. In other words, the mask process used in the manufacture of the array substrate may include a cleaning, a deposition, a baking, a photo, a development, an etching, a peeling, etc.

A printing process may be used to form an active layer and a contact hole in the array substrate for the related art IPS mode LCD device of FIG. 1. A photo process is used to form the gate electrode, the source/drain electrodes, the channel, the pixel electrode and the common electrode. Generally, the photo process is complex and expensive. On the contrary, the printing process is simple and cheap.

However, the manufacture of the array substrate for the related art IPS mode LCD device requires a large number of mask processes. Also, because three photo processes are required, it costs a great deal and the manufacturing time increases due to the complexity of the process. Therefore, the manufacturing yield may be greatly reduced. When the mask process is reduced by simply one, the manufacturing time, the productivity and the manufacturing cost can be reduced considerably. For these reasons, efforts to reduce the processes have been actively made pursued.

SUMMARY OF THE INVENTION

Accordingly, the present invention is directed to an array substrate for an IPS mode LCD device that substantially obviates one or more problems due to limitations and disadvantages of the related art.

An advantage of the present invention is to provide a method for manufacturing an array substrate for an IPS mode LCD device in which the number of photo processes is reduced, thereby reducing cost and simplifying a process.

Additional advantages and features of the invention will be set forth in part in the description which follows, and in part will become apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, there is provided a method for manufacturing an array substrate for an IPS mode liquid crystal display device. The method includes: forming a gate electrode, a gate line, a data line and a common line on a substrate using a printing process; forming an active layer on the substrate including the gate electrode using a printing process; forming a source electrode, a drain electrode, a pixel electrode including a plurality of zigzag-shaped pixel electrode bars, and a common electrode including a plurality of common electrode bars arranged in an alternating pattern crossing with the pixel electrode bars using a photo process, wherein a thin film transistor is provided with the gate electrode, the active layer, the source electrode and the drain electrode; forming at least one contact hole on the substrate including the thin film transistor using a printing process to expose a portion of the common line and a portion of the common electrode; and forming a connecting metal using a printing process to electrically connect the common line and the common electrode through the at least one contact hole.

In another aspect of the present invention, an array substrate for an IPS mode liquid crystal display device includes: a plurality of gate lines arranged in a first direction; a plurality of data lines arranged in a second direction substantially perpendicular to the gate lines; a common line arranged adjacent to the gate lines in the first direction; a thin film transistor formed in a pixel region, the pixel region being defined by the gate line and the data line; a pixel electrode connected to the thin film transistor, the pixel electrode including a plurality of pixel electrode bars arranged substantially in parallel to the data lines; a common electrode connected to the common line, the common electrode including a plurality of common electrode bars that are arranged in an alternating pattern with the pixel electrode bars; at least one contact hole formed to expose a portion of the common line and a portion of the common electrode; and a connecting metal electrically connecting the common line and the common electrode through the at least one contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings.

The printing technology of the present invention is identical to the principles for printing characters in paper. That is, the printing technology directly prints the resist pattern instead of ink on the objects to be etched. Due to advances in technology, it is possible to directly print a fine pattern. However, the resolution for the pattern is limited. The present invention may be applied to various products including large-screen TV products that do not require a high resolution. Presently, the manufacturing costs of a large-screen LCD TV are very high irrespective of the resolution because, in photolithography technology, the amount of various materials used to manufacture are the same. However, because only necessary portions are directly printed in cases in which photolithography technology is used, the printing technology of the present invention has an effect that materials can be remarkably decreased in the manufacture of large-screen LCD TVs that do not require a high resolution.

Figure 2:
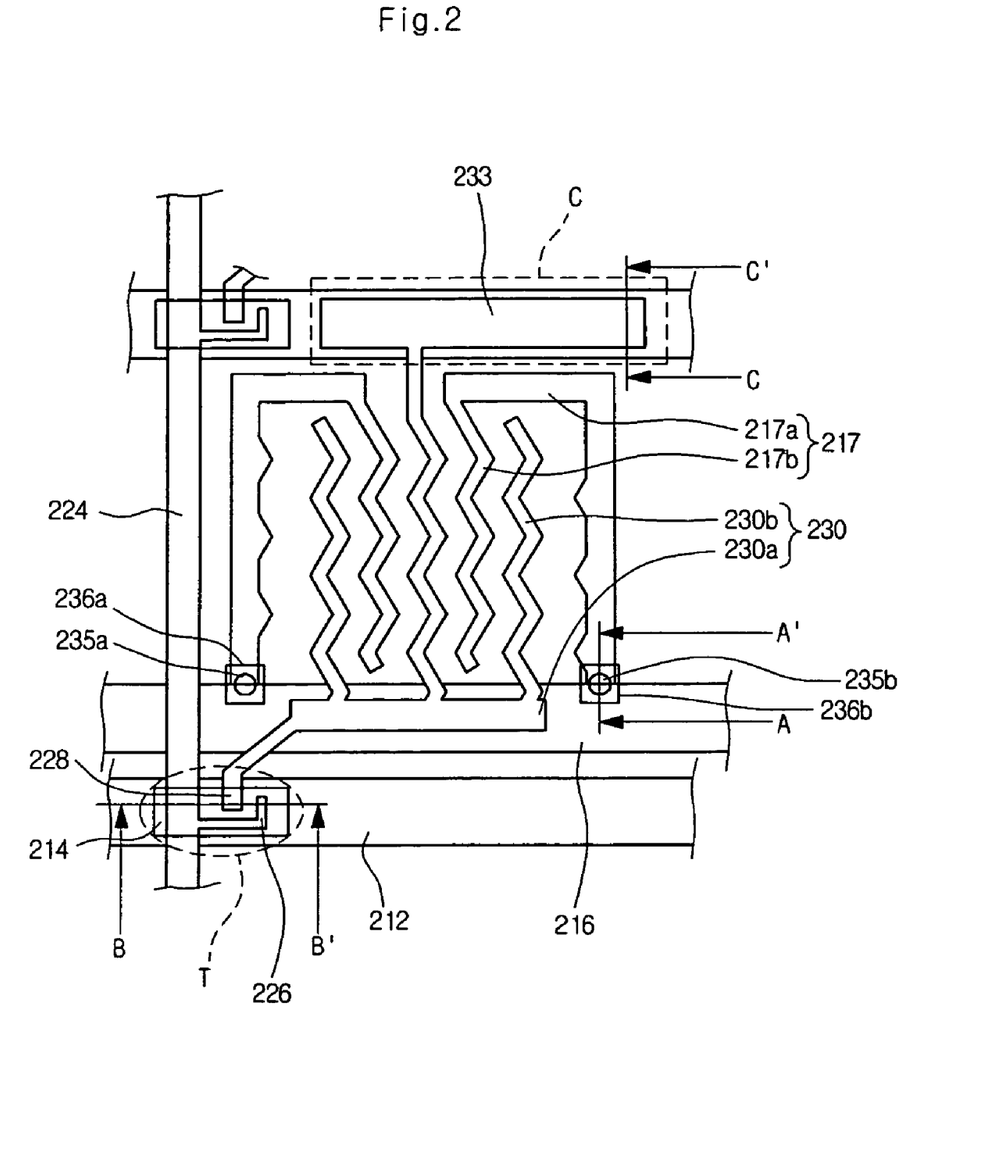
FIG. 2 is a plan view of an array substrate for an IPS mode LCD device according to an embodiment of the present invention.

FIG. 2 is a plan view of an array substrate for an IPS mode LCD device according to an embodiment of the present invention.

In FIG. 2, an array substrate according to the present invention has a storage capacitor on gate (SOG) structure.

The array substrate includes a plurality of gate lines 212 spaced apart from each other by a predetermined distance and arranged substantially in parallel to a first direction, a plurality of common lines 216 formed in the same direction as the gate lines 212, and a plurality of data lines 224 arranged in a second direction that are substantially perpendicular to the gate lines 212 and the common lines 216. A pixel region P is defined by a gate line 212 and a data line 224.

A thin film transistor T is formed at a crossing point of the gate line 212 and the data line 224. The thin film transistor T includes a gate electrode 214, an active layer (not shown), a source electrode 226 and a drain electrode 228. The gate electrode 214 is connected to the gate line 212, and the source electrode 226 is connected to the data line 224. Also, the drain electrode 228 is connected to the pixel electrode 230.

The pixel electrode 230 may be formed in a zigzag shape. The pixel electrode 230 includes a plurality of vertical pixel electrode bars 230*b* and a horizontal pixel electrode bar 230*a*. The vertical pixel electrode bars 230*b* are arranged substantially in parallel to the data line 224 and spaced apart from one another by a predetermined distance. The horizontal pixel electrode bar 230*a* is arranged substantially perpendicular to the data line 224. One of the vertical pixel electrode bars 230*b* may be extended upward and connected to another horizontal pixel electrode bar (hereinafter, referred to as a storage electrode) 233. The storage electrode 233 may be arranged on a portion of the gate line 212, with a gate insulating layer (not shown) interposed therebetween. Thus, a storage capacitor C is formed between the gate line 212 and the storage electrode 233.

The common electrode 217 is connected to the common line 216. The common electrode 217 may be formed in a zigzag shape. The common electrode 217 includes a plurality of vertical common electrode bars 217*b* and a horizontal common electrode bar 217*a*. The vertical common electrode bars 217*b* are arranged substantially in parallel to the data line 224 and spaced apart from the vertical pixel electrode bar 230b by a predetermined distance. The horizontal common electrode bars 217a are connected to the vertical common electrode bars 217b and arranged substantially perpendicular to the data line 224.

The common electrode 217 is formed with the data line 224. The vertical pixel electrode bars 230b and the vertical common electrode bars 217b are arranged in an alternating pattern and cross each other.

Two horizontal common electrode bars 217a may be provided. One of the horizontal common electrode bars is extended and electrically connected to the common line 216 through a first contact hole 235a, and the other is extended and electrically connected to the common line 216 through a second contact hole 235b.

Figure 3:
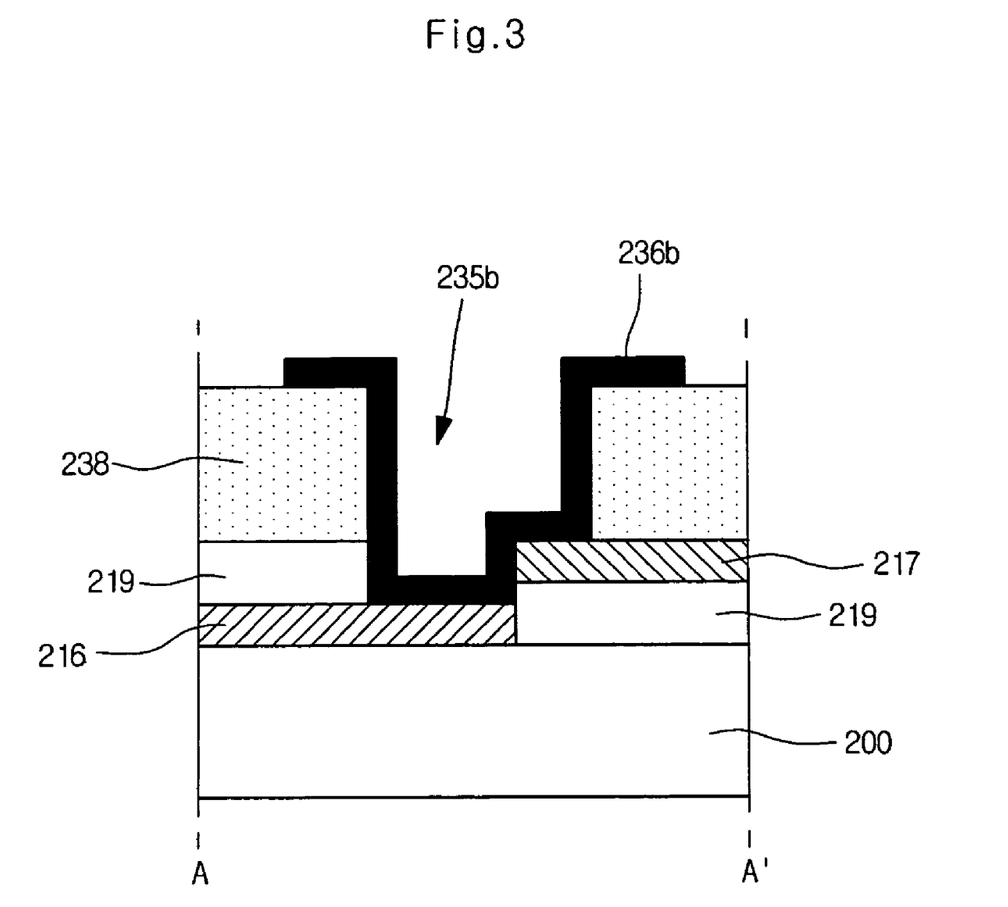
FIG. 3 is a sectional view taken along the line A-A' of FIG. 2.

FIG. 3 is a sectional view taken along the line A-A' of FIG. 2.

In FIG. 3, the common line 216 is formed on a substrate 200. The gate insulating layer 219 and the common electrode 217 are formed on the common line 216 on a left side and a right side from the second contact hole 235b, respectively. A passivation layer 238 is formed on the gate insulating layer 219 and the common electrode 217. A connecting metal 236b is formed to electrically connect the common line 216 and the common electrode 217 through the second contact hole 235b.

A printing process may be used in forming the gate line 212, the active layer (not shown), the contact holes 235a and 235b, and the process of depositing the connecting metals 236a and 236b.

The printing process includes gravure printing, offset printing and screen printing. For example, the gravure printing process includes an operation of smearing a patterned groove with an ink or resist, an operation of smearing a roller with a patterned ink, and an operation of rolling the roller smeared with the patterned ink on the substrate, to form the pattern on the substrate.

A one-time photo process may be used in the formation of the channel region including the source and drain electrodes 226 and 228 of the thin film transistor T, the formation of the zigzag-shaped pixel electrode 230 connected to the drain electrode 228, the formation of the storage electrode 233 connected to the pixel electrode 230 in some portion and formed on the gate line 212, the formation of the zigzag-shaped common electrode 217 connected to the common line 216, and the formation of an outer pad.

Accordingly, in the manufacture of the array substrate for the IPS mode LCD device of the present invention, a straight line is formed using the printing process, and the fine and complicated shapes such as the zigzag-shaped pixel electrode and common electrode are formed using the photo process.

The present invention can be used to manufacture the array substrate using an one-time photo process to simplify the overall manufacturing process and reduce manufacturing costs.

FIGS. 4A to 4D are sectional views taken along the lines A-A', B-B' and C-C' of FIG. 2, showing the sequential procedures of manufacturing the array substrate of the present invention.

Figure 4A:
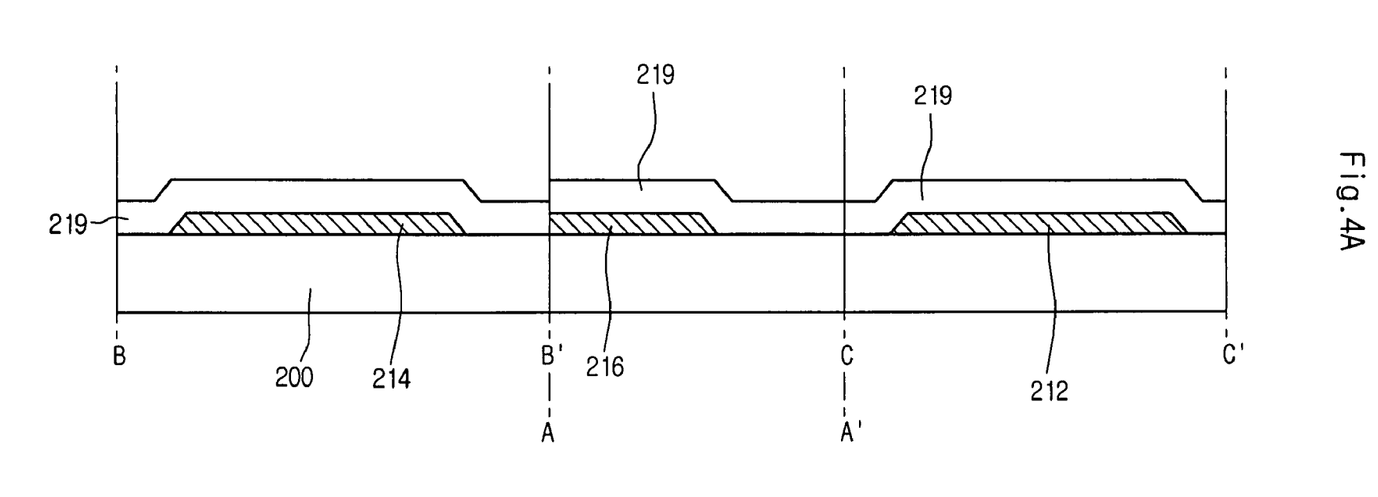
FIGS. 4A to 4D are sectional views taken along the lines A-A', B-B' and C-C' of FIG. 2, showing a manufacturing process of the array substrate.

In FIG. 4A, a metal selected from conductive metal groups including aluminum alloy and chrome (Cr) is deposited on a substrate 200 to form the gate line 212, including the gate electrode 214 and the common line 216 spaced apart from the gate line 212 substantially in parallel. After a resist pattern is formed using the printing process to pattern the common line 216, the common line 216 is formed using an etching process. Then, the gate insulating layer 219 is formed by depositing silicon nitride ($SiN_x$) or silicon oxide ($SiO_2$) on a whole surface of the substrate 200 in which the gate line 212 and the common line 216 are formed.

Figure 4B:
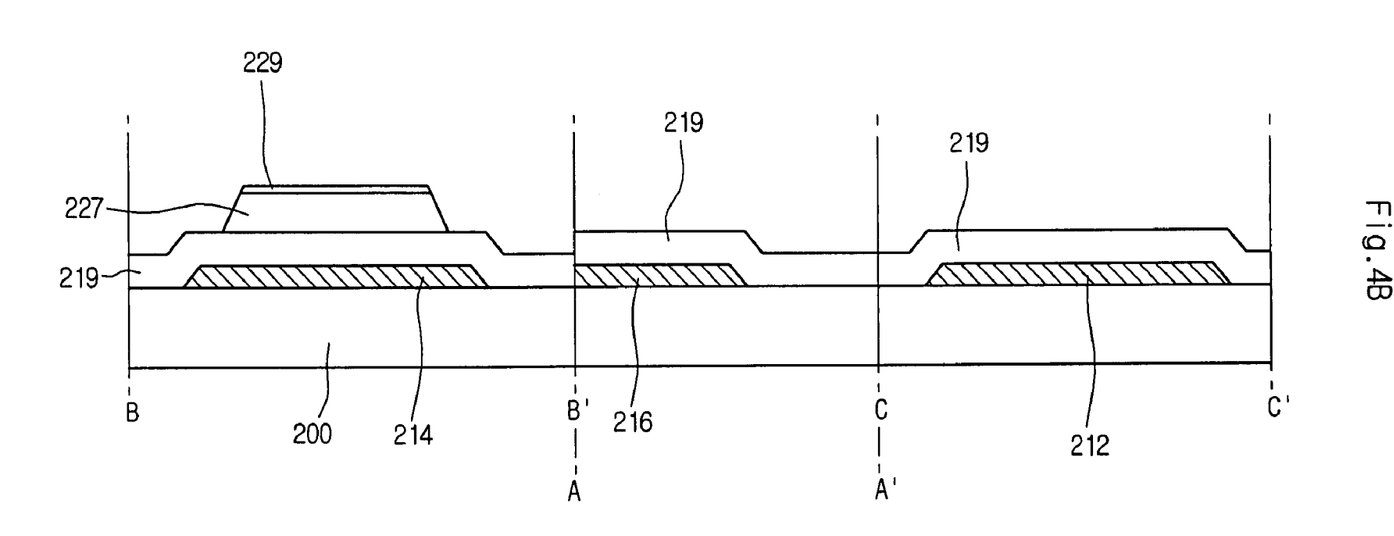

In FIG. 4B, an amorphous silicon (a-Si:H) and an impurity-doped amorphous silicon (n+a-Si:H) are deposited on the gate insulating layer 219 and then patterned to form an active layer 227 and ohmic contact layer 229. Here, the active layer 227 and the ohmic contact layer 229 are formed by etching the resist pattern that is formed using the printing process.

Figure 4C:
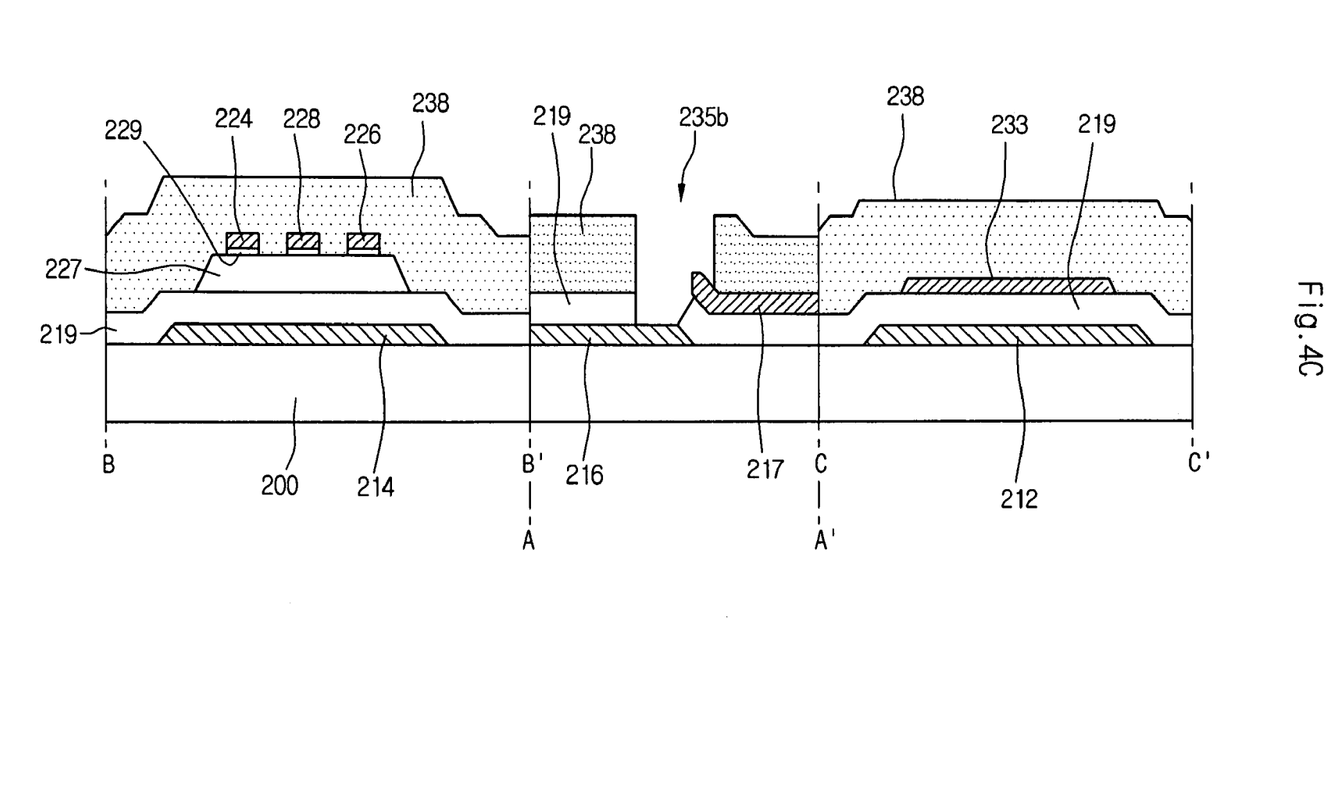

In FIG. 4C, a metal selected from the above-described conductive metal groups is deposited on a whole surface of the substrate in which the active layer 227 and the ohmic contact layer 229 are formed. Then, the resultant structure is patterned to form the data line 224, the source electrode 226, the drain electrode 228, the pixel electrode 230, the storage electrode 233, and the common electrode 217. The data line 224 defines the pixel region P along with the gate line 212. The source electrode 226 protrudes from the data line 224 and overlaps with one upper portion of the active layer 227. The drain electrode 228 is spaced apart from the source electrode 226 by a predetermined distance and formed on the active layer 227, thereby forming the channel. The pixel electrode 230 includes the horizontal pixel electrode bar 230a, and the plurality of vertical pixel electrode bars 230b. The horizontal pixel electrode bar 230a is connected to the drain electrode 228. The vertical pixel electrode bars 230b are connected to the horizontal pixel electrode bar 230a and spaced apart from one another. Also, the vertical pixel electrode bars 230b are formed in a zigzag shape and arranged substantially in parallel with the data line 224. The storage electrode 233 is extended from the vertical pixel electrode bars 230b and formed on the gate line 212. The common electrode 217 is alternately crossed with the vertical pixel electrode bars 230b.

In the above-described process, the ohmic contact layer 229 exposed between the two electrodes 226 and 228 is etched using the source electrode 226 and the drain electrode 228 as the masks, thereby exposing the active layer 227.

The thin film transistor T is provided with the gate electrode 214, the active layer 227, the ohmic contact layer 229, the source electrode 226, and the drain electrode 228.

One photo process is used to form the channel region, the zigzag-shaped pixel electrode 230, the storage electrode 233, and the zigzag-shaped common electrode 217, and the outer pad.

Then, a passivation layer 238 is formed by depositing a material selected from organic insulating material groups including benzo-cyclo-butane (BCB) and acrylic resin on a whole surface of the substrate in which the source and drain electrodes 226 and 228 and the data line 224 are formed. Also, the passivation layer 238 can be formed by depositing silicon nitride ($SiN_x$) or silicon oxide ($SiO_2$). Then, the contact hole 235b is formed by patterning the passivation layer 238 using the printing process. The contact hole 235b exposes some portions of the common line 216 and the common electrode 217 at a predetermined upper position of the common line 216.

Figure 4D:
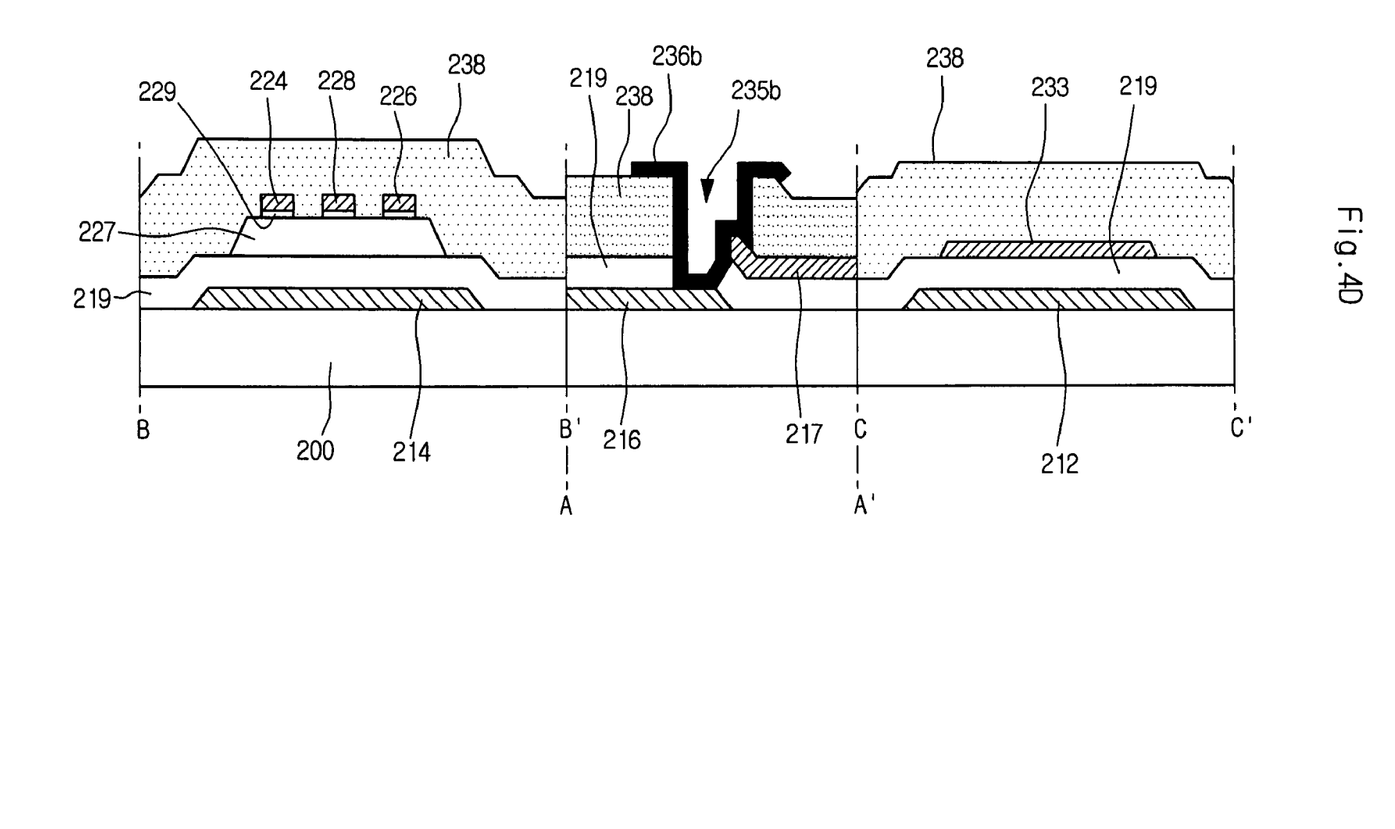

In FIG. 4D, the connecting metal 236b for electrically connecting the common line 216 and the common electrode 217 is formed on the contact hole 235b. The connecting metal 236b is formed using the printing process. Through the above-described processes, the array substrate for the IPS mode LCD device according to the present invention is manufactured.

Figure 5:
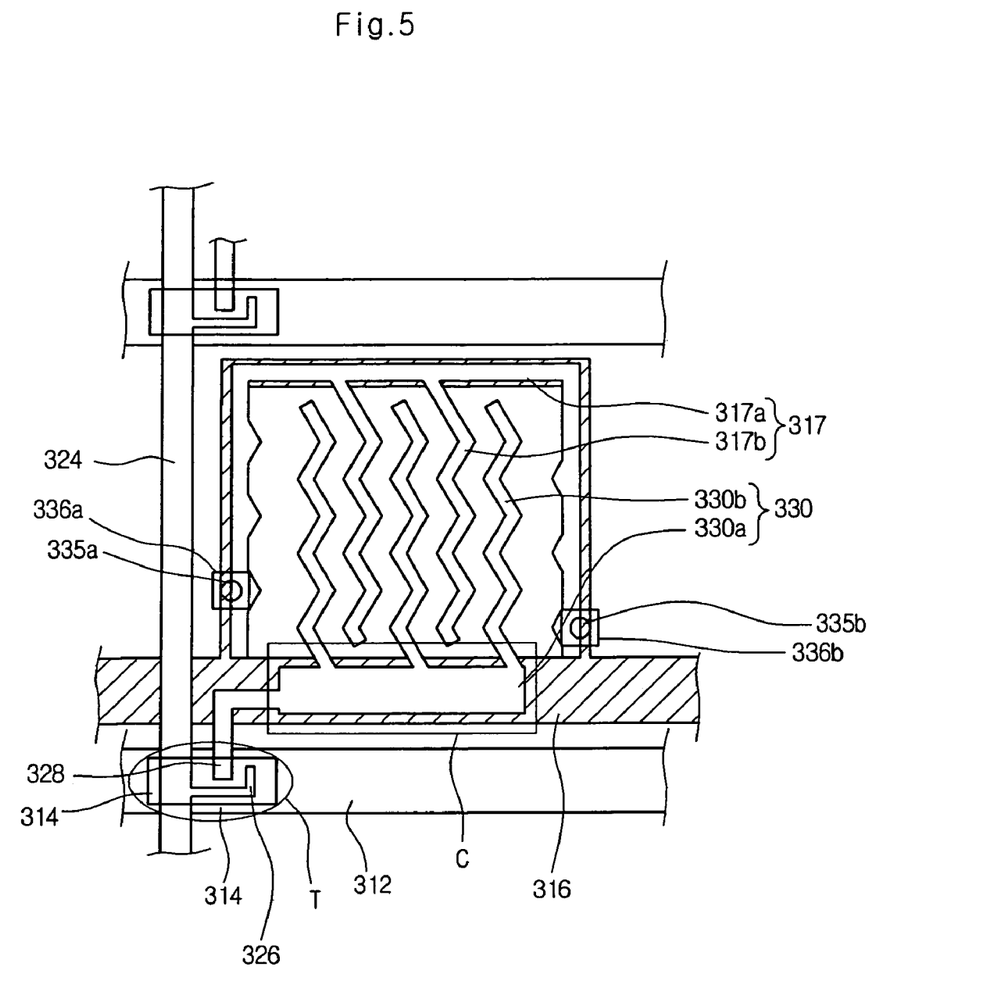
FIG. 5 is a plan view of an array substrate for an IPS mode LCD device according to another embodiment of the present invention.

FIG. 5 is a plan view of an array substrate for the IPS mode LCD device according to another embodiment of the present invention.

In FIG. 5, an array substrate according to the present invention has a storage on common (SOC) structure.

The array substrate includes a plurality of gate lines 312 spaced apart from each other by a predetermined distance and arranged substantially in parallel in a first direction, a plurality of common lines 316 formed in the same direction as the gate lines 312, and data lines 324 arranged in a second direction that is substantially perpendicular to the gate lines 312 and the electrode lines 316. A pixel region P is defined by a gate line 312 and a data line 324.

A thin film transistor T is formed at a crossing point of the gate line 312 and the data line 324. The thin film transistor T includes a gate electrode 314, an active layer (not shown), a source electrode 326 and a drain electrode 328. The gate electrode 314 is connected to the gate line 312, and the source electrode 326 is connected to the data line 324. Also, the drain electrode 328 is connected to the pixel electrode 330.

The pixel electrode 330 is formed in a zigzag shape. The pixel electrode 330 includes a plurality of vertical pixel electrode bars 330b and a horizontal pixel electrode bar 330a. The vertical pixel electrode bars 330b are arranged substantially in parallel with the data line 324 and spaced apart from one another by a predetermined distance. The horizontal pixel electrode bar 330a is connected to the plurality of vertical pixel electrode bars 330b and the drain electrode 328 and is arranged substantially perpendicular to the data line 324. The horizontal pixel electrode bar 330a is arranged on a portion of the common line 316, with a gate insulating layer (not shown) interposed therebetween. Thus, a storage capacitor C is formed between the common line 316 and the horizontal pixel electrode bar 330a.

The common electrode 317 is connected to the common line 316. The common electrode 317 is formed in a zigzag shape. The common electrode 317 includes a plurality of vertical common electrode bars 317b and a horizontal common electrode bar 317a. The vertical common electrode bars 317b are arranged substantially in parallel with the data line 324 and spaced apart from the vertical pixel electrode bar 330b by a predetermined distance. The horizontal common electrode bar 317a is connected to the vertical common electrode bars 317b and arranged substantially perpendicular to the data line 324.

The common electrode 317 is formed together with the data line 324. The vertical pixel electrode bars 330b and the vertical common electrode bars 317b are alternately arranged with each other.

The common line 316 is overlapped along the horizontal common electrode bar 317a (that is, an outermost common electrode bar). Therefore, an auxiliary storage capacitor can be formed between the horizontal common electrode bar 317a and the common line 316.

The common line 316 and the horizontal common electrode bar 317b are electrically connected to each other through the first and second contact holes 335a and 335b. In other words, one portion of the horizontal common electrode bar 317a is electrically connected to the common line 316 through a connecting metal 336a, which is formed on the first contact hole 335a. Another portion of the horizontal common electrode bar 317a is electrically connected to the common line 316 through a connecting metal 336b, which is formed on the second contact hole 335b.

The printing process is used in the processes of forming the gate line 312, the common electrode line 316, the active layer (not shown) and the contact holes 335a and 335b, and used in the process of depositing the connecting metals 336a and 336b.

A one-time photo process is used in the formation of the channel region including the source and drain electrodes 326 and 328 of the thin film transistor T, the formation of the zigzag-shaped pixel electrode 330 connected to the drain electrode 328, the formation of the storage electrode 333 connected to the pixel electrode 330 in some portion and formed on the gate line 312, the formation of the zigzag-shaped common electrode 317 connected to the common electrode line 316, and the formation of an outer pad.

In the manufacture of the array substrate for the IPS mode LCD device of the present invention, a straight line is formed using the printing process, and the fine and complicated shapes such as the zigzag-shaped pixel electrode and common electrode are formed using the photo process.

Accordingly, the present invention can manufacture the array substrate using only one photo process, thereby simplifying the process and reducing the cost.

As described above, the complex and fine patterns are formed using one photo process and the other patterns are formed using the printing process. Therefore, it is possible to reduce the manufacturing cost and simplify the manufacturing process, thereby improving the manufacturing yield.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of manufacturing an array substrate for an IPS mode liquid crystal display device, the method comprising:
    forming a gate electrode, a gate line, and a common line on a substrate using a printing process;
    forming an active layer on the substrate including the gate electrode using a printing process;
    forming a source electrode, a drain electrode, a pixel electrode including a plurality of zigzag-shaped pixel electrode bars, and a common electrode including a plurality of common electrode bars arranged in an alternating pattern with the pixel electrode bars using a photo process, wherein a thin film transistor is provided by the gate electrode, the active layer, the source electrode and the drain electrode;
    forming at least one contact hole on the substrate, including the thin film transistor using a printing process, to expose a portion of the common line and a portion of the common electrode; and
    forming a connecting metal using a printing process to electrically connect the common line and the common electrode through the at least one contact hole.

2. The method according to claim 1, further comprising forming a gate insulting layer between the gate electrode and the active layer.

3. The method according to claim 1, wherein the printing process is performed using one of gravure printing, offset printing and screen printing.

4. An array substrate for an IPS mode liquid crystal display device, comprising:
    a gate line arranged in a first direction;
    a data line arranged in a second direction substantially perpendicular to the gate lines;
    a common line arranged adjacent to the gate line in the first direction;

a gate insulating layer formed on the common line;
a thin film transistor formed in a pixel region, the pixel region being defined by the gate line and the data line;
a pixel electrode connected to the thin film transistor, the pixel electrode including a plurality of pixel electrode bars arranged substantially in parallel to the data line;
a common electrode connected to the common line, the common electrode including a plurality of common electrode bars that are arranged in an alternating pattern with the pixel electrode bars;
a passivation layer over an entire surface of the substrate including the gate insulating layer and the common electrode;
at least one contact hole exposing a portion of the common line and a portion of the common electrode; and
a connecting metal directly contacting the passivation layer and indirectly connecting the common line and the common electrode through the at least one contact hole, wherein the plurality of pixel electrode bars are formed in a zigzag shape, and wherein the plurality of common electrode bars are formed in a zigzag shape.

5. The array substrate according to claim 4, wherein a portion of the pixel electrode is formed on the gate lines and a gate insulating layer is interposed therebetween.

6. The array substrate according to claim 5, wherein a storage capacitor is formed between portions of the gate lines and the pixel electrode.

7. The array substrate according to claim 4, wherein a portion of the pixel electrode is formed on the common line and a gate insulating layer is interposed therebetween.

8. The array substrate according to claim 7, wherein a storage capacitor is formed between portions of the common line and the pixel electrode.

9. The array substrate according to claim 4, wherein the common line is overlapped along an outermost common electrode bar.

10. The array substrate according to claim 9, wherein an auxiliary storage capacitor is formed between the outermost common electrode bar and the common line.

* * * * *